F. H. VAN HOUTEN.
MACHINE FOR SPACING LUMPS OF DOUGH.
APPLICATION FILED OCT. 9, 1915.
1,319,190.
Patented Oct. 21, 1919.
2 SHEETS—SHEET 1.
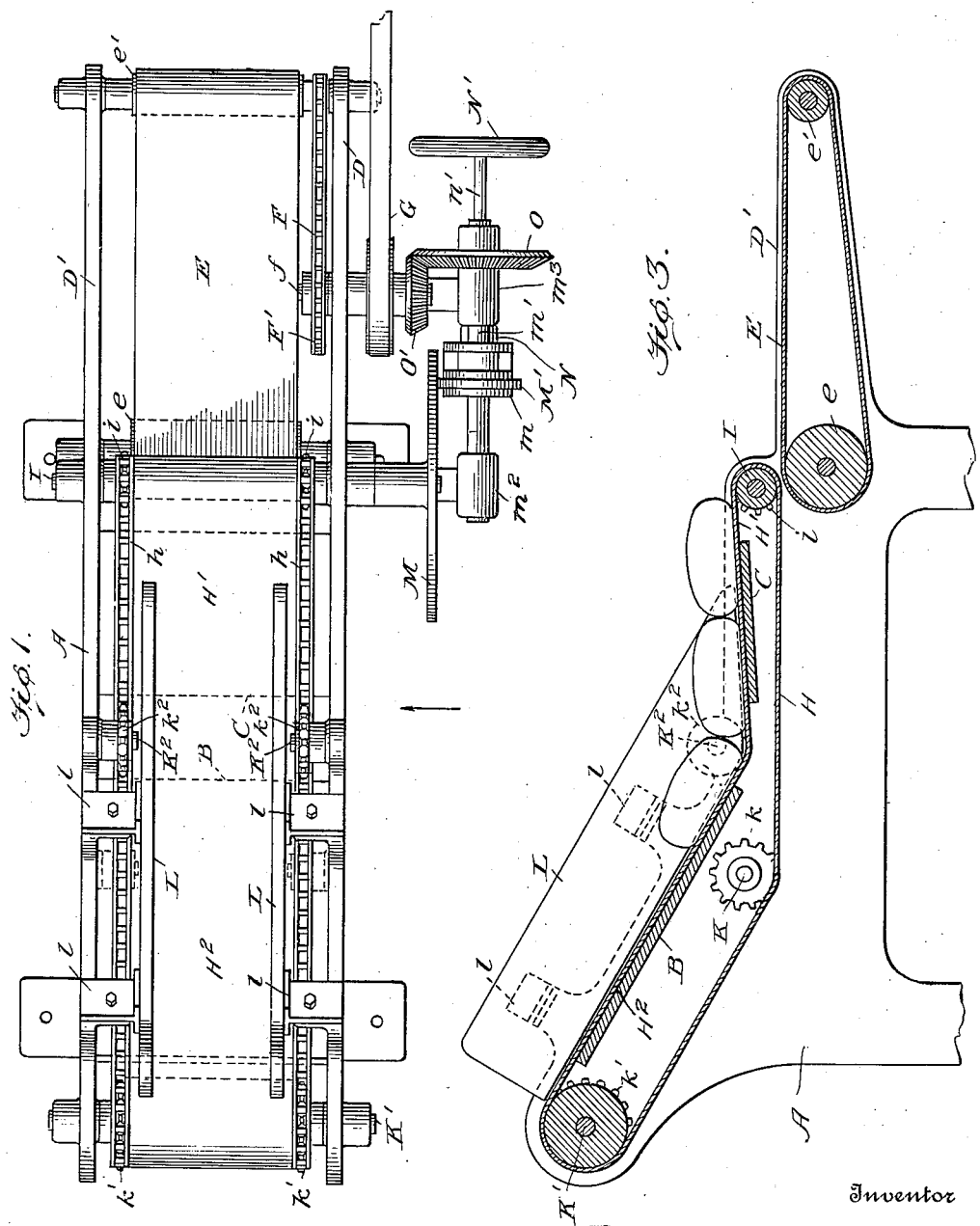
Witness
Inventor
Frank H. Van Houten
By Church & Church
his Attorneys

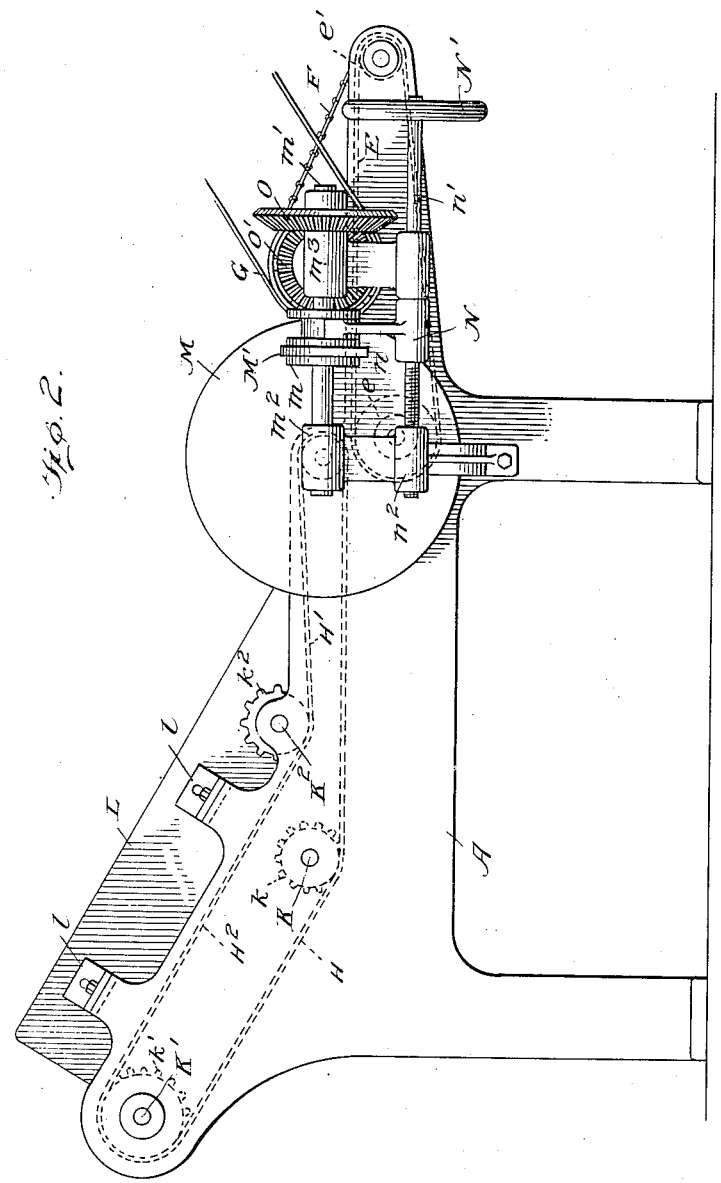

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

MACHINE FOR SPACING LUMPS OF DOUGH.

1,319,190.

Specification of Letters Patent. Patented Oct. 21, 1919.

Application filed October 9, 1915. Serial No. 55,102.

*To all whom it may concern:*

Be it known that I, FRANK H. VAN HOUTEN, a citizen of the United States, residing at Beacon, in the county of Dutchess and State of New York, have invented certain new and useful Improvements in Machines for Spacing Lumps of Dough; and I do hereby declare the following to be a full, clear, and exact description of the same, reference being had to the accompanying drawings, forming part of this specification.

This invention relates to machines for spacing lumps of dough, the novel features of the present invention being conveniently embodied in a machine of the type disclosed in my co-pending application Serial No. 809,341, filed December 29, 1913.

In said co-pending application, the machine embodies a traveling carrier or belt which discharges the lumps of dough from the machine at a uniform speed, and a traveling feeder belt for depositing the lumps of dough on the discharge belt, the said traveling feeder belt being driven at a slower speed than the discharge belt. The traveling feeder belt consists of two reaches, a horizontal reach positioned above the discharge belt to discharge the lumps of dough thereupon and an inclined reach which directs the lumps of dough downwardly over an inclined supporting surface or table to the horizontal reach on which they are assembled in a continuous unbroken line. Assembling of the dough lumps in this manner on the horizontal reach is assisted by spaced lateral guides fixed to the inclined table. In action, when the respective belts are driven forwardly, one lump of dough will lie immediately adjacent the next succeeding lump, and the unbroken line of lumps are fed forward in this condition and deposited separately on the discharge belt which, because of its greater speed of travel, will space the lumps a uniform distance apart, so that mechanical appliances may be utilized to subsequently handle the same with certainty and precision.

As shown in said co-pending application the inclined reach of the feeder belt passes over and around the lower end of the inclined table and forms a loop intermediate the lower end of the incline and the inner terminal of the horizontal table. The result is that the lumps of dough, during the period of their travel between the lower end of the incline and the receiving end of the horizontal table, are not supported by the feeder belt, but are permitted to drop from the incline on the horizontal reach. There being no positive guide for the lumps of dough at this point of their travel, a piling up of the lumps in a mass is apt to occur and thus disturb the continuity of the feed to the discharge belt. The present invention comprehends a machine which is designed to obviate these disadvantages by the provision of a feeder belt, one reach of which extends over the discharge belt in position to deposit lumps of dough carried thereby on the discharge belt and the other reach of which extends directly from the inner terminal of the first named reach upwardly over said incline, whereby the lumps of dough are continuously supported by the traveling feeder down the incline and to the point of discharge located over the discharge belt.

A further object of the invention is the provision of novel mechanism for quickly changing the rate of speed of the traveling feeder belt, thereby accommodating the machine to space lumps of dough of different sizes.

Other objects of the invention are to generally improve the construction of a machine of this character, all of which will appear from the ensuing detail description, when taken in connection with the accompanying drawings which illustrate a structural embodiment of the invention in a preferred form. The novel features of the invention will be particularly pointed out and specified in the appended claims.

In the drawings,—

Figure 1 is a horizontal plan view of a machine for spacing lumps of dough, embodying the present improvements.

Fig. 2 is a side elevation of the same looking in the direction of the arrow of Fig. 1.

Fig. 3 is a longitudinal section of the machine partly in elevation.

Like reference characters throughout the several figures indicate the same parts.

In the form shown in the drawings, the machine embodies a frame A which may be of any preferred construction adapted to rest on the floor of a bakery and to support in substantially stepped or successive relation to each other, an incline B, a substantially horizontal table C located below the incline and forwardly extending longitudinal guides D, D' located at a lower level than table C. All of the above enumerated parts are arranged in successive alinement, as shown more particularly in Fig. 3. The longitudinal guides D, D' form the opposite supporting members of a discharge belt E which passes around an inner guide pulley *e* and an outer relatively small drive pulley *e'*. Both pulleys *e*, *e'* are mounted on transverse shafts, each shaft being journaled at its opposite end in the side members of the frame. The drive pulley *e'* receives its motion through the belt F which passes over a driven pulley F' on a transverse stub shaft *f*. Motion to drive the pulley F' may be transmitted by a suitable pulley and belt connection G with any source of power.

A traveling feeder belt H having drive chains *h* is provided with a horizontal reach H' which is adapted to pass over and be supported by the table C and to deposit lumps of dough directly on the receiving end of the discharge belt E. The feeder belt H at the outer terminal of its horizontal reach H' passes around a drive shaft I with its chains *h* in mesh with drive sprockets *i* on said shaft. Shaft I is located above the receiving end of discharge belt E and the lumps of dough are carried forward in an unbroken row by the horizontal reach H' and deposited directly on the discharge belt E. From the shaft I the belt H passes back under idler sprockets *k* on a shaft K and around and over relatively larger sprockets *k'* on a shaft K' located at the upper end of incline B, from which the downwardly inclined reach $H^2$ of the belt passes down the incline B and back over the substantially horizontal table C.

Positioned intermediate the lower end of incline B and the inner terminal of horizontal table C and located over belt H are idler sprockets $k^2$ on a shaft $K^2$, with their teeth in mesh with the sprocket chains *h* of the feeder belt. These sprockets $k^2$ provide a means for effecting a positive change in the direction of movement of the feeder belt at the point between the table C and the incline B where the inclined reach $H^2$ of the belt merges into the substantially horizontal reach H'.

The above described construction provides a feeding surface on which the dough is continuously supported from the highest point of the incline or the inlet of the dough to the point of discharge located over the discharge belt, and because of the fact that the dough is continuously driven forward by the positive action of the feeder belt until the lumps are deposited on the discharge belt, there is no point during the feed of the dough lumps where there is any danger of their piling up and destroying the continuity of the feed. This insures the assembling of the lumps of dough in a continuous unbroken row on the horizontal reach. To assist the inclined reach in so depositing the lumps of dough on the horizontal reach H', lateral guides L may be secured on opposite sides of the incline B by any suitable means such as the supporting brackets *l*.

In order to adapt the machine for the spacing of lumps of dough of different sizes, it is desirable that the speed of the traveling feeder belt H be capable of variation, although in practice the speed of the feeder belt will always be less than the speed of the discharge belt E. For this purpose a friction disk M is mounted on the drive shaft I and motion is imparted to said friction disk M by a friction pinion M'. Friction pinion M' is mounted in a bearing *m* which is slidable on the longitudinal driven shaft *m'*. Shaft *m'* is journaled at its ends in fixed bearings $m^2$, $m^3$ on suitable brackets reaching out from the frame A. Secured to the bearing *m* by a connecting web *n* is a sleeve N which is fixed to a shaft *n'* screw-threaded in a bearing member $n^2$. By turning hand wheel N', shaft *n'* may be shifted in its bearing $n^2$ and consequently the point of engagement of friction pinion M' with disk M shifted to vary the speed of friction disk M and drive shaft I. In this manner adjustment of hand wheel N' is effective to change the rate of drive of feeder belt H. Shaft *m'* is driven by a bevel pinion O in mesh with a bevel pinion O' on stub shaft *f*.

What is claimed is:—

1. A dough spacer, a plurality of supporting rollers, a constantly-driven endless conveyer directed over said rollers, and rotatable means between said rollers coöperating with said conveyer to divide it into two directly merging reaches, one a downwardly directed reach having a considerable slope, and the other substantially horizontal, whereby rolls of dough deposited at the top of the first reach at irregular intervals will roll down the incline forming an unbroken row and be delivered at the end of the second reach at regular intervals of time.

2. In a dough spacer, a plurality of supporting rollers, a constantly driven endless conveyer directed over said rollers, rotatable means between said rollers, coöperating with said conveyer to divide it into two directly merging reaches, one a downwardly directed reach having a considerable slope, and the other a substantially horizontal reach having a slight slope, and a relatively faster endless conveyer beneath the delivery end of the substantially horizontal reach, whereby rolls of dough delivered at the top of the first reach at irregular intervals will roll down the incline, form an unbroken row on the second reach and be delivered by the relatively faster conveyer in equispaced relation suitable for automatic handling.

3. The device of claim 2 plus means for altering the relative speeds of the two conveyers to enable the machine to handle different sizes of dough balls while preserving the same space between the delivered balls of dough.

4. In a dough spacer, the combination with means for discharging spaced balls of dough, means for receiving balls of dough at irregular intervals and for delivering the same at regular intervals to said discharging means, said receiving means including a relatively steep lowering reach of belt and a relatively horizontal advancing reach of belt merging directly at the point of juncture, and means for driving the discharging means at greater speed than the receiving means.

5. In a dough spacer, the combination with means for discharging spaced balls of dough, means for receiving balls of dough at irregular intervals and for delivering the same at regular intervals to said discharging means, and means operable during the running of the machine for altering the relative speeds of the discharging and receiving means to enable the machine to handle different sizes of dough balls while preserving the same space between the delivered balls of dough.

FRANK H. VAN HOUTEN.

Witnesses:
 ROY F. URQUHART,
 JOHN DINWIDDIE.